United States Patent [19]
Hiramatsu et al.

[11] 3,861,502
[45] Jan. 21, 1975

[54] AUTOMATIC CLEARANCE ADJUSTING DEVICE FOR HYDRAULICALLY OPERATED DISC BRAKE

[75] Inventors: Takeo Hiramatsu; Kenji Yahata; Shigeki Futaki, all of Kyoto, Japan

[73] Assignee: Mitsubishi Jidosha Kogyo Kabushiki Kaisha Mirato-ku, Tokyo, Japan

[22] Filed: Sept. 24, 1973

[21] Appl. No.: 399,976

[52] U.S. Cl. ............................ 188/196 V, 188/71.8
[51] Int. Cl. ............................................ F16d 65/54
[58] Field of Search ............ 188/71.8, 196 P, 196 S, 188/196 V

[56] References Cited
UNITED STATES PATENTS

| | | | |
|---|---|---|---|
| 2,154,082 | 4/1939 | Baker | 188/196 V |
| 2,732,042 | 1/1956 | Lucker | 188/196 V |
| 3,085,663 | 4/1963 | Jakeways | 188/196 P |
| 3,255,846 | 6/1966 | Livezey | 188/196 P X |

*Primary Examiner*—Duane A. Reger
*Attorney, Agent, or Firm*—Oldham & Oldham Co. L.P.A.

[57] ABSTRACT

An automatic clearance adjusting device for a hydraulically operated disc brake, comprising a servo piston, a stopper, resilient means provided between the servo piston and the stopper, and adjusting means. In the device, the adjusting means is movable upon the operational movement of the stopper with the servo piston and the backward movement of the stopper is prevented by a wedge effect provided by the adjusting means to maintain the stroke of the servo piston at a constant value.

9 Claims, 5 Drawing Figures

PATENTED JAN 21 1975  3,861,502
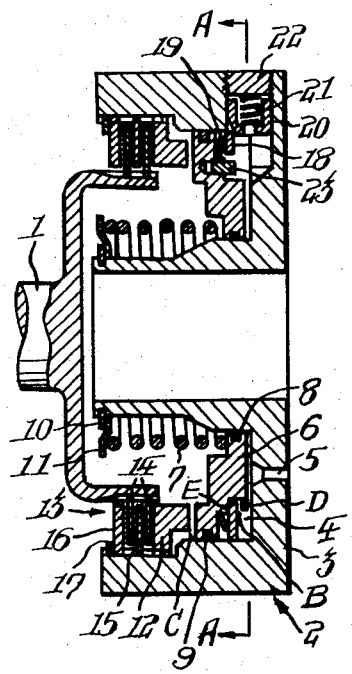
Fig. 1.
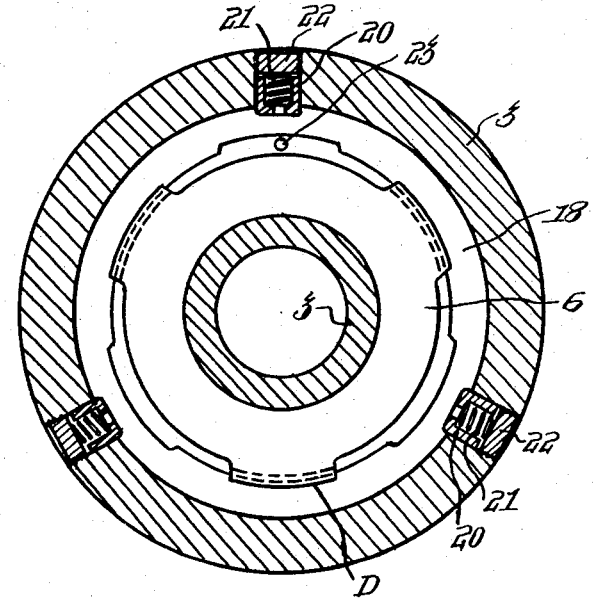
Fig. 2.
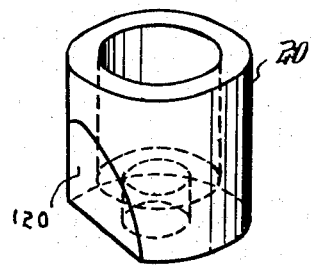
Fig. 3.
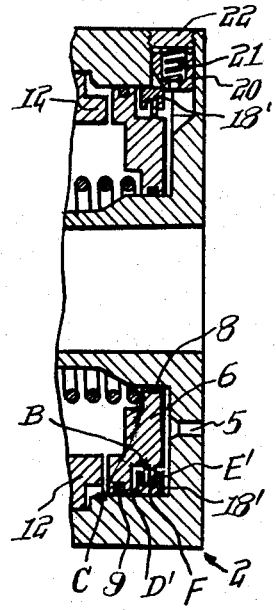
Fig. 4.
Fig. 5.

AUTOMATIC CLEARANCE ADJUSTING DEVICE FOR HYDRAULICALLY OPERATED DISC BRAKE

BACKGROUND OF THE INVENTION

This invention relates to an automatic clearance adjusting device for a hydraulically operated disc brake.

In conventional hydraulically operated disc brakes, for example, for use in automatic transmissions, it has been experienced that upon wear of the brake disc(s) the take-up stroke of the servo piston of the brake is increased, thereby increasing the time of deceleration in the automatic transmission. Furthermore by delay of brake engagement, the engine idles at rather relatively high speed, thereby seizing the brake disc(s).

In disc brakes provided initially with proper clearance adjustment, it has been experienced that upon increasing of wear of the disc(s), correspondingly increasing of deceleration time, the disc(s) becomes seized acceleratively by the increase of generation of energy produced by friction at the disc in brake engagement.

SUMMARY OF THE INVENTION

In order to avoid the above disadvantages, the present invention is provide with an automatic clearance adjusting device for a hydraulically operated disc brake, which maintains constantly the take-up stroke of the servo piston.

Though the automatic clearance adjusting device of the present invention compensates mainly for the wear of brake disc for an automatic transmission, it can be used in the other field for compensation of wear in hydraulically operated disc brakes.

BRIEF DESCRIPTION OF THE DRAWINGS

FIG. 1 is a cross sectional view of the automatic clearance adjusting device for the hydraulically operated disc brake, according to the invention, FIG. 2 is a sectional view of the automatic clearance adjusting device, taken along the line A—A of FIG. 1, FIG. 3 is a perspective view of an adjustor of the device in FIG. 1, FIG. 4 is a cross sectional view of a modified automatic clearance adjusting device according to the invention, and FIG. 5 is a partial perspective view of a stopper of the device in FIG. 4.

DESCRIPTION OF THE PREFERRED EMBODIMENT

Referring to the drawings, numeral 1 is a rotatable shaft. A hydraulically operated servomotor, generally indicated by numeral 2, includes a housing 3 which is provided with therein a pressure chamber 4 between an axially slidable servo piston 6 and the inner end wall of the housing 3 for receiving fluid pressure.

Numeral 5 is an oil port drilled in the housing 3 to lead the fluid pressure into the chamber 4. A return spring 7 is positioned between the servo piston 6 and a retainer 11 which is in an abutting engagement with a snap ring 10 attached to the housing 3 at its end, thereby urging the servo piston 6 to the right in FIG. 1 upon release of the fluid pressure to the servo piston 6.

In order to prevent the fluid in the chamber 4 from leaking, seal rings 8 and 9 are received in grooves on inner and outer peripheries of the servo piston 6 respectively.

A disc brake, generally indicated by numeral 13, comprises inner discs 14, an outer plate 15, a distance plate 16 and a pressure plate 12. The inner discs 14 are supported by the shaft 1 so as to rotate therewith and be movable on the shaft 1 in the axial direction. On both of the axial surfaces of the inner discs 14 frictional members are fixed.

A snap ring 17 is fixed to the housing 3 at its inner end to receive a pressing force from the servo piston 6 at the housing 3 through the distance plate 16.

A stopper 18 is provided in the pressure chamber 4 of the housing 3 to be displaceable in the direction of movement of the servo piston 6. The servo piston 6 is formed with an abutting portion E defining distance of return movement of the servo piston 6 and a pressing portion D adapted to displace the stopper 18 in an operational direction of the servo piston 6 in response to the wear in the disc brake. The abutting portion E and the pressing portion D are arranged to hold the stopper 18 with a constant clearance B. The constant clearance B is of the same amount of an adjustable clearance C of the disc brake 13. There is provided between the servo piston 6 and the stopper 18 a conical spring 19 which is provided with a spring force weaker than that of the return spring 7 and urges the stopper 18 to the right in FIG. 1.

An adjustor 20 which is of wedge-shaped, as formed by cutting off a portion of a cylindrical member, is mounted in the inner wall of the housing 3. The adjustor 20 includes a spring 21 in its interior and is continuously urged by the spring 21 towards the center axis of the housing 3, so that the adjustor 20 is freely movable towards the center axis upon the movement of the stopper 18 in the operational direction of the servo piston 6, but it prevents the stopper 18 by a wedge effect of a flat inclined surface 120 at the radially inner end of the adjustor 20 from moving axially outwardly upon the return movement of the servo piston 6.

A plug 22 is threaded in the housing 3 to prevent leakage of the fluid pressure in the pressure chamber 4 therefrom and it serves as a retainer of the spring 21. As seen from FIG. 2, there is provided three adjustors on the periphery of the housing 3, but it may be possible to provide any number of adjustors.

There is provided a pin 23 for preventing the servo piston 6 from disalignment with the stopper 18 after the assembly thereof, thereby to prevent a rotational movement relatively to each other.

The structure of the clearance adjusting device has been described, and will now be described an operation thereof.

In assembly of the disc brake, the adjustor 20, the spring 21 and the plug 22 will be assembled lastly.

Upon supplying of the fluid pressure through the oil port 5 to the pressure chamber 4, the servo piston 6 is urged to the left in FIG. 1 in opposition to the return spring 7. The stopper 18 is stand-still until the clearance B between the stopper 18 and the servo piston 6 becomes zero, since the stopper 18 is urged by the conical spring 19, carried by the servo piston, to the right in FIG. 1. When the clearance B becomes zero, and the servo piston 6 moves to the left depending upon amount of wear in the disc brake 13, the stopper 18 is moved by the pressing portion D to the left integrally with the servo piston 6 by the leftwards movement thereof.

Upon the leftward movement of the stopper 18, the adjustor 20 is moved by the spring 21 towards the center axis. However the stopper 18 will not be forced to the left by the spring 21, since the force thereof is lower than that of the conical spring 19.

Then, discharging of the fluid pressure in the pressure chamber 4, the servo piston 6 is moved to the right in FIG. 1 by the return spring 7. At this time the stopper 18 also intends to move to the right, but such movement is obstructed by the wedge effect of the adjustor 20 since the wedge effect prevents the adjustor 20 from moving in a radially outward direction, so that the stopper 18 is retained in this position. Accordingly only the servo piston 6 moves towards the right by the amount of the clearance B. After the servo piston 6 moves that amount, such movement is terminated by means of the stopper 18 and the conical spring 19.

As described the above, the servo piston 6 will only return the amount of the clearance B, so that the adjustable clearance C is continuously maintained constant even when wear of the inner discs 14 occurs.

In FIGS. 4 and 5, there is shown another embodiment according to the invention, which is identical to the first embodiment except that the conical spring 19 in the first embodiment is removed and a stopper 18' itself functions for the same. The stopper 18' is provided with a split 24 on its periphery and an annular groove 25 along the inner periphery which receives a projection F of the servo piston 6 with a constant clearance B. The stopper 18' is positioned in the pressure chamber 4 to fit frictionally with the inner wall of the pressure chamber in the housing 3 through a spring force provided by the stopper 18'.

The stopper 18' includes projecting portions D' and E' which are defined by the groove 25 and the inner periphery of the stopper 18' and of which the projecting portion E' defines the return movement of the servo piston 6 by the abutting engagement of the projection F with the portion E' while the projecting portion D' is adapted to displace the stopper 18' in the operational direction of the servo piston 6 in response to the wear in the disc brake 13 by the abutting engagement with the projection F.

The spring force of the stopper 18' applied to the inner wall of the housing 3 is so provided that the stopper 18' is prevented by the wedge effect of the adjustor 20 from movement in the release direction of the servo piston 6, but moved in the operational direction by the pressing force of the servo piston 6 produced by the fluid pressure.

This invention will not be defined to the above described embodiments and it may be possible to make any modifications to the device or to apply any other devices without departing from the spirits of the invention.

For example, it may be used a coil spring or corrugated spring instead of the conical spring 19 in the first embodiment. It may be also arranged the movement of the adjustor 20 to displace transversely relative to the rotatable shaft, instead of at right angle.

The present invention, as described the above, provides an automatic clearance adjusting device which is of a simple construction and adapted to adjust automatically the take-up stroke of the servo piston to a constant value by arranging that the clearance between the servo piston and the stopper is of the same amount with the return stroke of the servo piston in release operation of the disc brake. Also, as its simple construction, the device is reliable in operation to compensate for the wear in the disc brake. Furthermore, the same effect as to the present invention may be obtained by making simple modifications to conventional disc brakes.

What is claimed is:

1. An automatic clearance adjusting device for a hydraulically operated disc brake, comprising a servo piston slidable by hydraulic pressure within a housing and operative on a disc of said brake, a return spring for returning said servo piston so as to release said brake upon release of the hydraulic pressure to said servo piston, an annular stopper provided in an annular pressure chamber of said servo piston and slidable in directions of movement of said servo piston, an abutting portion between said servo piston and said stopper for defining the distance of return movement of said servo piston, another abutting portion between said servo piston and said stopper being adapted to displace said stopper in operational direction of said servo piston in response to the wear of said brake disc, and an adjusting means fixed to the housing and movable by a spring effect upon the movement of said stopper in said operational direction and provided with an inclined notch at its periphery so as to prevent said stopper by a wedge effect from moving in said return direction, and resilient means mounted between said stopper and said servo piston and provided with a force greater than that of said adjusting means but weaker than the pressing force of said servo piston by said fluid pressure.

2. An automatic clearance adjusting device according to claim 1, wherein said resilient means is a spring which urges said stopper in the direction of said return movement of said servo piston.

3. An automatic clearance adjusting device according to claim 1, wherein said resilient means is provided by said stopper having a split thereon, thereby, said stopper frictionally and resiliently engaging with the inner periphery of said housing.

4. An automatic clearance adjusting device for a hydraulically operated disc brake, comprising a servo piston slidable by hydraulic pressure in an annular pressure chamber formed in a housing and operative on a disc of said brake, a return spring for returning said servo piston so as to release said brake disc upon release of the hydraulic pressure on said servo piston, an annular stopper provided in said pressure chamber and slidable in the directions of movement of said servo piston, an abutting portion being provided between said servo piston and said stopper for defining the distance of return movement of said servo piston, another abutting portion being provided between said servo piston and said stopper adapted to displace said stopper in the brake operational direction of said servo piston in response to wear of said brake disc, and an adjusting means slidably positioned in the housing and movable by a spring effect upon the movement of said stopper in said brake operational direction and provided with an inclined surface on its periphery engaging said stopper to prevent it from moving in said return direction.

5. An automatic clearance adjusting device according to claim 4, wherein resilient means is positioned between said stopper and said servo piston and comprises a spring which urges said stopper in the direction of said return movement of said servo piston.

6. An automatic clearance adjusting device according to claim 4, wherein said stopper has a split therein, and said stopper frictionally and resiliently engages the inner periphery of said housing.

7. An automatic clearance adjusting device according to claim 4, wherein a plurality of circumferentially spaced adjusting means are provided to engage said stopper and such means engage said stopper by a wedge action.

8. An automatic clearance adjusting device according to claim 4, wherein said adjusting means is cylindrical and is positioned for movement radially of said pressure chamber, the inclined surface of said cylindrical adjusting means being flat and being at the inner end of said adjusting means, said flat surface being inclined radially outwardly of said adjusting means.

9. An automatic clearance adjusting device according to claim 4, wherein a plurality of circumferentially spaced adjusting means are provided to engage said stopper, and such adjusting means have beveled inner end surfaces forming said inclined surface that engages said stopper by a wedge action, and said adjusting means being positioned for movement radially of the housing, and spring means continuously biasing said adjusting means radially inwardly.

* * * * *

UNITED STATES PATENT OFFICE
CERTIFICATE OF CORRECTION

Patent No. 3,861,502            Dated January 21, 1975

Inventor(s) Takeo Hiramatsu et al.

It is certified that error appears in the above-identified patent and that said Letters Patent are hereby corrected as shown below:

Item [73], cancel "Mirato-Ku".

Signed and Sealed this twenty-ninth Day of July 1975

[SEAL]

Attest:

RUTH C. MASON
*Attesting Officer*

C. MARSHALL DANN
*Commissioner of Patents and Trademarks*